May 15, 1934.  H. LUX  1,958,971
METHOD OF HIGH FREQUENCY AMPLIFICATION FOR VERY SHORT WAVES
Filed Sept. 15, 1932
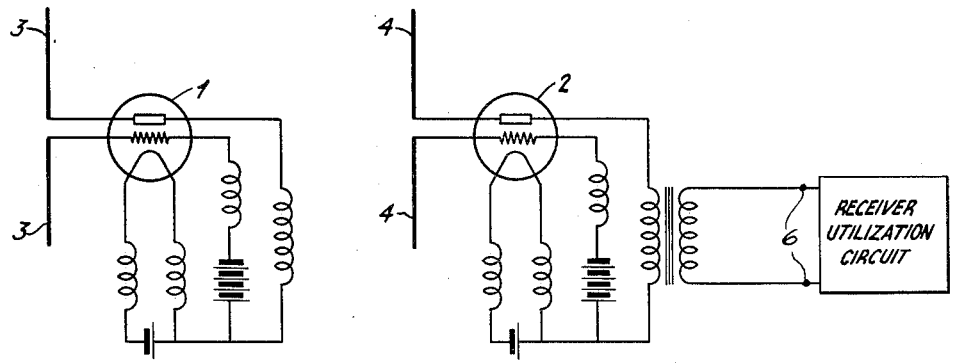
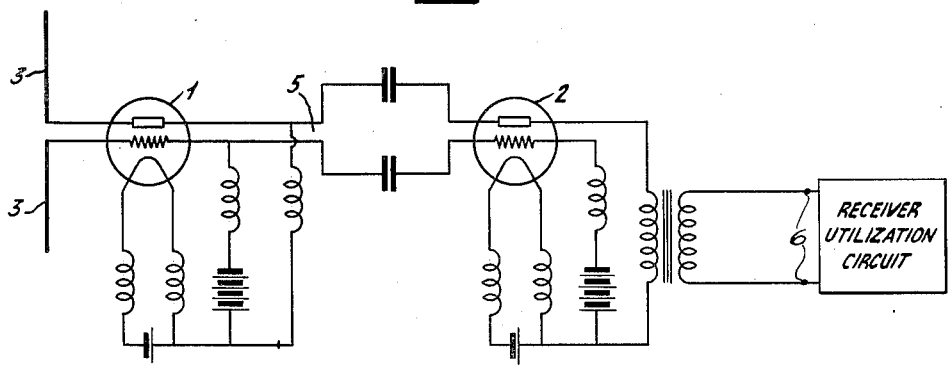
INVENTOR
HEINZ LUX
BY
ATTORNEY Patented May 15, 1934

1,958,971

UNITED STATES PATENT OFFICE 1,958,971

METHOD OF HIGH FREQUENCY AMPLIFICATION FOR VERY SHORT WAVES

Heinz Lux, Berlin, Germany, assignor to Telefunken Gesellschaft fur Drahtlose Telegraphie m. b. H., Berlin, Germany, a corporation of Germany Application September 15, 1932, Serial No. 633,274
In Germany December 12, 1931

5 Claims. (Cl. 250—20)

The reception of very short waves having a wave length range of the order of a decimeter is preferably carried out by means of a tube arranged in braking field connection in accordance with the teachings of Barkhausen and Kurz. As is well known, in such a tube the grid is at a high positive potential and the anode at a low positive or even a negative potential with respect to the cathode, whereby pendular motion of the electrons about the grid is effected. Such an arrangement is described in German Patent No. 435,463, to which reference is made for a more complete description of the operation of the so-called Barkhausen-Kurz system. By regulating the operating potentials, this tube may be adjusted to oscillate when waves are received. It may be said in a way, that the damping of the tube circuit is reduced in view of the input frequency. Dipoles may be provided at two electrodes, for example, at the grid and the anode. These dipoles supply to the tube a receiving frequency of a definite amplitude, thus exciting the tube to carry out natural oscillations of equal frequency, the intensity of which is determined by the intensity of the signal voltage impressed upon the electrodes. As soon as the tube oscillates, an anode direct current flows which varies in accordance with the incoming field strength and which, after proper amplification, may serve for operating any suitable indicating instrument, such as a telephone, provided that the arriving signals are modulated at low frequency. It is important to make the exciting voltage as large as possible in view of the fact that the output energy of the successive low frequency amplified oscillations is practically limited. A direct high frequency amplification, as effected by customary means, cannot be realized due to the internal tube capacities.

According to the present invention, a novel method of high frequency amplification for very short waves is attained by using two tubes connected in the Barkhausen-Kurz manner. One tube which may be excited by the arriving signals to produce oscillations is connected in the same braking field circuit as for receiving purposes. These oscillations are applied to a second tube similarly operating in braking field connection. The manner in which this may be accomplished is indicated in Figures 1 and 2 which show two embodiments of the present invention.

Figure 1 shows an arrangement by way of example according to which two tubes 1 and 2, which are connected in the known braking field circuit functioning on the well known Barkhausen-Kurz principle, are provided with dipoles 3, 3 and 4, 4 respectively whereby radiation coupling is effected between the two dipoles, i. e. the oscillations of tube 1 are transmitted from the dipole 3, 3 to the dipole 4, 4.

Figure 2 shows another circuit embodiment in which both tube systems may be capacitively coupled through a Lecher wire system 5. In both circuits the receiving translation circuit is connected at 6.

In accordance with the above described arrangement the electrodes of the second tube 2 will have larger exciting voltages than those of the first tube. Consequently, the anode direct current of the second tube will be higher, a condition resulting in amplification of the incoming signals before their rectification.

I claim:

1. Receiving apparatus having, in combination, a first tube connected in the Barkhausen-Kurz manner, a second tube connected in the Barkhausen-Kurz manner, an antenna connected to two electrodes of said first tube, said two electrodes being capacitively coupled to similar electrodes of said second tube, and a utilization circuit connected to the output of said second tube.

2. A receiving amplifier circuit comprising a first tube having anode and control electrodes, an energy collector circuit coupled to said anode and control electrodes, a second tube having anode and control electrodes, said control electrodes of both tubes being at high positive potentials with respect to their respective associated anode electrodes, said second tube being arranged to amplify oscillations received from said first tube, and a utilization circuit connected to said second tube.

3. A receiving amplifier circuit comprising a first tube having anode and control electrodes, a second tube having anode and control electrodes, said control electrodes of both tubes being at high positive potentials with respect to their respective associated anode electrodes, a dipole connected to said electrodes of each of said tubes, said second tube being arranged to receive oscillations from said first tube, and a utilization circuit connected to said second tube.

4. An ultrashort wave amplifier system comprising a first tube having anode, cathode and control electrodes, a second tube having anode, cathode and control electrodes, said control electrodes being at high positive potentials with respect to their associated cathodes, and both of said anodes being at a much lower potential than that applied to said control electrodes with respect to the associated cathodes, individual dipoles having arms connected to the anodes and control electrodes of each tube, and high frequency apparatus coupled to the anode circuit of said second tube.

5. A system in accordance with claim 4 characterized in this, that both of said dipoles are disposed vertically and parallel to one another.

HEINZ LUX.